United States Patent
Balliet et al.

(10) Patent No.: US 6,835,479 B2
(45) Date of Patent: Dec. 28, 2004

(54) SYSTEM AND METHOD FOR SHUTTING DOWN A FUEL CELL POWER PLANT

(75) Inventors: Ryan J. Balliet, West Hartford, CT (US); Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 338 days.

(21) Appl. No.: 10/180,393

(22) Filed: Jun. 26, 2002

(65) Prior Publication Data

US 2004/0001980 A1 Jan. 1, 2004

(51) Int. Cl.⁷ .............................................. H01M 8/04
(52) U.S. Cl. ............................. 429/13; 429/19; 429/22
(58) Field of Search ............................... 429/13, 19, 22, 429/30, 12

(56) References Cited

U.S. PATENT DOCUMENTS

| | | | |
|---|---|---|---|
| 3,990,912 A | * 11/1976 | Katz | 429/14 |
| 5,013,617 A | 5/1991 | Scheffler | |
| 5,045,414 A | 9/1991 | Bushnell et al. | |
| 5,320,718 A | * 6/1994 | Molter et al. | 205/555 |
| 6,024,848 A | 2/2000 | Dufner et al. | |
| 6,372,983 B1 | 4/2002 | Knaggs | |
| 6,399,231 B1 | * 6/2002 | Donahue et al. | 429/13 |
| 6,514,635 B2 | * 2/2003 | Van Dine et al. | 429/17 |
| 2003/0207162 A1 | * 11/2003 | Reiser | 429/22 |
| 2003/0224228 A1 | * 12/2003 | Reiser et al. | 429/13 |

FOREIGN PATENT DOCUMENTS

WO          WO 99/34465      * 7/1999

* cited by examiner

Primary Examiner—Patrick Ryan
Assistant Examiner—Tracy Dove
(74) Attorney, Agent, or Firm—Malcolm J. Chisholm, Jr.

(57) ABSTRACT

The invention is a system and method for shutting down a fuel cell power plant having at least one fuel cell, a primary load, and an auxiliary load that receive electrical current from electrodes of the fuel cell through an external circuit. Shutting down the plant includes disconnecting the primary load; terminating flow of the oxidant through a cathode flow field; connecting the auxiliary load to consume oxygen within the fuel cell; disconnecting the auxiliary load; connecting a power supply to the fuel cell electrodes to increase a concentration of hydrogen within the cathode flow field; and, then, decreasing or eliminating flow of hydrogen into an anode flow field after an equilibrium gas concentration of at least 0.0001% hydrogen, balance fuel cell inert gases, is achieved in both the anode and cathode flow fields.

8 Claims, 1 Drawing Sheet

US 6,835,479 B2

SYSTEM AND METHOD FOR SHUTTING DOWN A FUEL CELL POWER PLANT

TECHNICAL FIELD

The present invention relates to fuel cell power plants that are suited for usage in transportation vehicles, portable power plants, or as stationary power plants, and the invention especially relates to procedures for shutting down an operating fuel cell system.

BACKGROUND OF THE INVENTION

Fuel cell power plants are well-known and are commonly used to produce electrical energy from hydrogen containing reducing fluid and process oxidant reactant streams to power electrical apparatus such as power plants and transportation vehicles. In fuel cell power plants of the prior art, it is well known that, when an electrical circuit connected to the fuel cells is disconnected or opened and there is no longer a load across the cell, such as upon and during shut down of the cell, the presence of air on a cathode electrode along with hydrogen fuel remaining on an anode electrode, often cause unacceptable anode and cathode potentials, resulting in oxidation and corrosion of catalyst and catalyst support materials and attendant cell performance degradation.

Efforts have been proposed to return the cathode electrode to a passive, non-oxidative state upon shut down of the fuel cell. For example, it was thought that inert gas needed to be used to purge both the anode flow field and the cathode flow field immediately upon cell shut down to passivate the anode and cathode electrodes so as to minimize or prevent such cell performance degradation. Further, the use of an inert gas purge avoided, on startup, the possibility of the presence of a flammable mixture of hydrogen and air, which is a safety issue. While the use of 100% inert gas as the purge gas is most common in the prior art, commonly owned U.S. Pat. Nos. 5,013,617 and 5,045,414 describe using 100% nitrogen as the anode side purge gas, and a cathode side purging mixture comprising a very small percentage of oxygen (e.g. less than 1%) with a balance of nitrogen. Both of these patents also discuss the option of connecting a dummy electrical load across the cell during the start of a purging process to lower the cathode potential rapidly to between the acceptable limits of 0.3–0.7 volt.

A solution has been proposed that avoids the costs associated with storing and delivering a separate supply of inert gas to fuel cells. The costs and complexity of such stored inert gases are undesirable especially in automotive applications where compactness and low cost are critical, and where the system must be shut down and started up frequently. That solution includes shutting down a fuel cell power plant by disconnecting the primary electricity using device (hereinafter, "primary load"), shutting off the air or process oxidant flow, and controlling the fuel flow into the system and the gas flow out of the system in a manner that results in the fuel cell gases coming to equilibrium across the cells, with the fuel flow shut off, at a gas composition (on a dry basis, e.g. excluding water vapor) of at least 0.0001% hydrogen, balance fuel cell inert gas, and maintaining a gas composition of at least 0.0001% hydrogen (by volume), balance fuel cell inert gas, during shut down. Preferably, any nitrogen within the equilibrium gas composition is from air either introduced into the system directly or mixed with the fuel. This method of fuel cell shut down also includes, after disconnecting the primary load and shutting off the air supply to the cathode flow field, continuing to supply fresh fuel to the anode flow field until the remaining oxidant is completely consumed. This oxidant consumption is preferably aided by having a small auxiliary load applied across the cell, which also quickly drives down the electrode potentials. Once all the oxidant is consumed the fuel feed is stopped, a fuel exit valve is shut, and air is introduced into the anode flow field (if needed) until the hydrogen concentration in the anode flow field is reduced to a selected intermediate concentration level, above the desired final concentration level. Air flow into the anode flow field is then halted, and the fuel cell gases are allowed to come to equilibrium, which will occur through diffusion of gases across the electrolyte and chemical and electrochemical reaction between the hydrogen and the added oxygen.

An intermediate hydrogen concentration level is selected based upon the relative volumes of the anode and cathode flow fields, such that the resulting hydrogen concentration at equilibrium (i.e. after all the oxygen has been consumed and the hydrogen and fuel cell inert gases are fully dispersed throughout the cell) will be within a desired range. Thereafter, during continued shut-down, a hydrogen concentration is monitored; and hydrogen is added, as and if necessary, to maintain the desired hydrogen concentration level. That shut down method urges that a desired range of hydrogen concentration is between 0.0001% and 4%, with the balance being fuel cell inert gases. The latter step of adding hydrogen is likely to be required due to leakage or diffusion of air into the fuel cell and/or leakage or diffusion of hydrogen out of the fuel cell, such as through seals. As air leaks into the system, hydrogen reacts with the oxygen in the air and is consumed. The hydrogen needs to be replaced, from time to time, to maintain the hydrogen concentration within the desired range.

Known improvements to the problem of oxidation and corrosion of electrode catalysts and catalyst support materials have reduced the deleterious consequences of the presence of oxygen on the cathode electrode and a non-equilibrium of reactant fluids between the anode and cathode electrodes that result in unacceptable anode and cathode electrode potentials upon and during shut down of a fuel cell. However, during the time it takes for an adequate amount of hydrogen to diffuse through the electrolyte from the anode flow field to the cathode flow field to achieve a hydrogen concentration equilibrium in both flow fields, an unacceptable potential exists at the cathode electrode leading to unwanted oxidative deterioration of the cathode catalyst and catalyst support materials.

Consequently, there is a need for a fuel cell power plant that does not cause significant performance degradation of the plant, and that minimizes oxidation and corrosion within plant fuel cells at shut down of the plant, during shut-down, or upon restarting the fuel cell power plant.

DISCLOSURE OF THE INVENTION

The invention is a system and method for shutting down a fuel cell power plant. The system for shutting down the fuel cell power plant includes at least one fuel cell for generating electrical current from hydrogen containing reducing fluid and process oxidant reactant streams. The fuel cell includes an anode electrode and a cathode electrode on opposed sides of an electrolyte; an anode flow field adjacent the anode electrode for directing the reducing fluid stream to flow adjacent the anode electrode; and a cathode flow field adjacent the cathode electrode for directing the process oxidant stream to flow adjacent the cathode electrode. A cathode inlet valve and a cathode outlet valve are secured to cathode inlet and exhaust lines in fluid communication with the cathode flow field for permitting and terminating flow of the process oxidant stream through the cathode flow field. An external circuit is connected to the anode and cathode electrodes for conducting the electrical current generated by the fuel cell, and a primary load is connected through a primary load switch to the external circuit. An auxiliary load is connected through an auxiliary load switch to the external circuit, and a power supply is connected through a power supply switch to the external circuit.

The fuel cell power plant may be controlled so that whenever the primary load switch disconnects the primary load from receiving the electrical current and the cathode inlet and outlet valves terminate flow of the process oxidant through the cathode flow field, the auxiliary load switch connects the auxiliary load to receive any electrical current from the fuel cell to consume oxygen remaining within the cathode flow field, and the power supply switch connects the power supply to the external circuit to increase a concentration of hydrogen within the cathode flow field. By applying the electrical power supply to the anode and cathode electrodes, the electrodes and electrolyte are effectively turned into a hydrogen pump, wherein the hydrogen fuel dissociates at the anode electrode into electrons and hydrogen ions, the hydrogen ions pass through the electrolyte to the cathode electrode as in normal fuel cell operation, and the electrons flow through the power supply to the cathode electrode to evolve hydrogen at the cathode electrode in the absence of oxygen. Therefore, application of the power supply across the cell significantly decreases an amount of time necessary to achieve equilibrium of hydrogen concentrations within the anode and cathode flow fields.

In order to minimize a risk of the hydrogen concentration within the cathode fuel cell becoming a flammable concentration as air diffuses into the cathode flow field during shut down of the plant through leaks, or upon start up of the plant as air is blown through the cathode flow field, a ventilation enclosure and ventilation fan may be included as part of the system.

The system may be utilized as a method for shutting down a fuel cell power plant through the steps of: disconnecting the primary load switch so that the primary load ceases receiving the electrical current from the fuel cell; terminating flow of the process oxidant through the cathode flow field; connecting the auxiliary load switch so that the auxiliary load receives any electrical current generated by the fuel cell to consume oxygen remaining within the cathode flow field; disconnecting the auxiliary load switch whenever oxygen remaining within the fuel cell has been consumed; connecting the power supply switch so that electrical power from the power supply flows to the anode and cathode electrodes to increase a concentration of hydrogen within the cathode flow field; and, then, decreasing or eliminating flow of the hydrogen containing reducing fluid into the anode flow field after an equilibrium gas concentration of at least 0.0001% hydrogen, balance fuel cell inert gases is achieved in both the anode and cathode flow fields while the fuel cell power plant is shut down.

In a further embodiment, the concentration of hydrogen within the anode and cathode fuel cells may be monitored, and fed into the flow fields as necessary to remain within a concentration range of between 0.0001% and 4.0% during shut down of the plant as hydrogen is consumed by any oxygen leaking into the flow fields. Additionally, the method may also include admitting air to pass into the anode flow field to avoid creation of a partial vacuum.

Accordingly, it is a general purpose of the present invention to provide a system and method of shutting down a fuel cell power plant that overcomes deficiencies of the prior art.

It is a more specific object to provide a system and method of shutting down a fuel cell power plant that hastens production of an equilibrium hydrogen concentration between anode and cathode flow fields to thereby passivate the cathode catalyst and catalyst support material.

It is yet another object to provide a system and method of shutting down a fuel cell power plant that minimizes oxidative deterioration of anode and cathode catalysts and catalyst support materials making up the anode and cathode electrodes.

It is another object to provide a system and method of shutting down a fuel cell power plant that minimizes oxidative deterioration without usage of stored inert gases to purge anode and cathode flow fields.

These and other objects and advantages of the present system and method of shutting down a fuel cell power plant will become more readily apparent when the following description is read in conjunction with the accompanying drawing.

DESCRIPTION OF THE PREFERRED EMBODIMENTS

Figure 1:
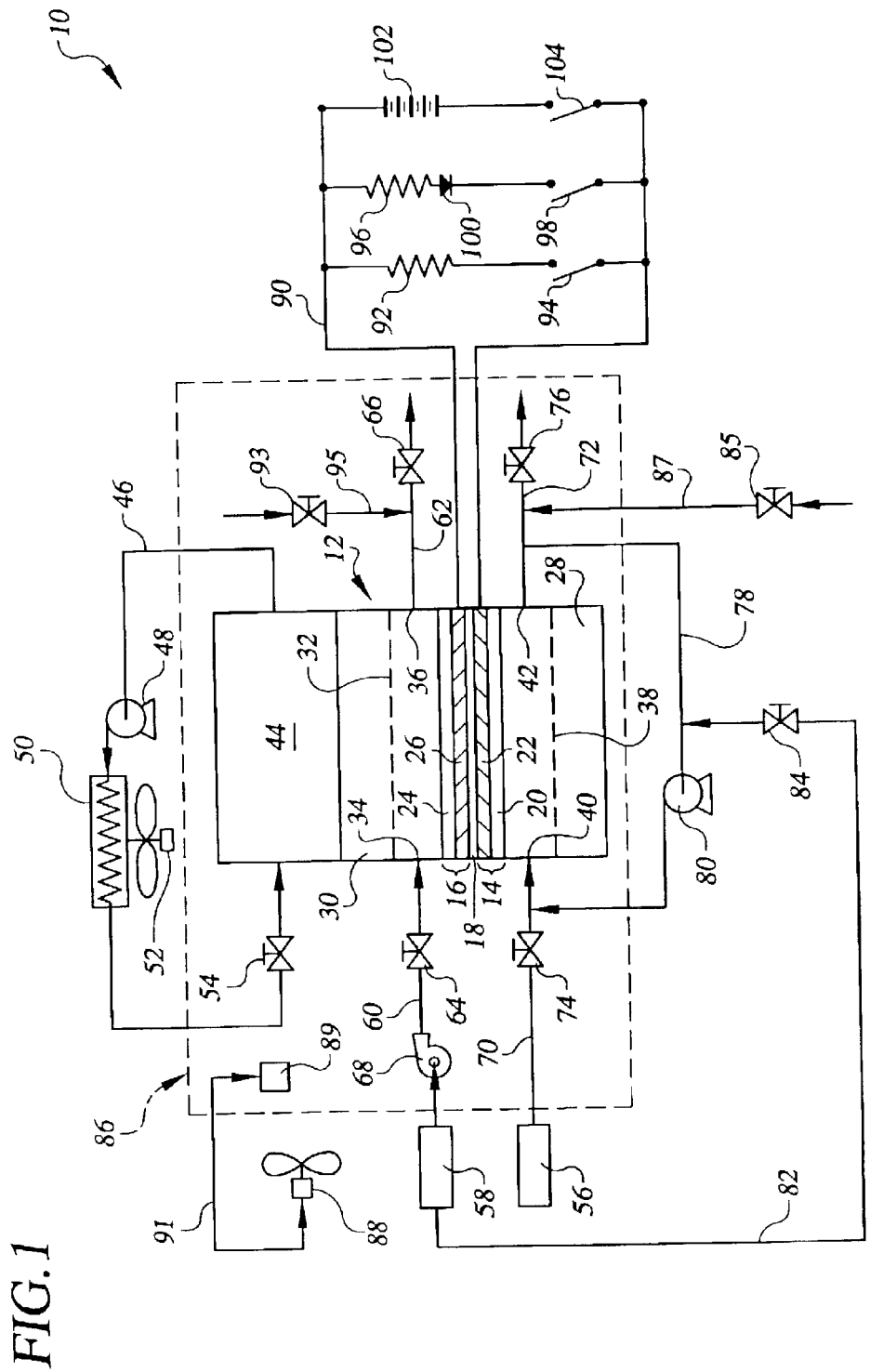
FIG. 1 is a schematic representation of a preferred embodiment of a system of shutting down a fuel cell power plant constructed in accordance with the present invention.

Referring to the drawings in detail, a first embodiment of a system for shutting down a fuel cell power plant is shown in FIG. 1, and is generally designated by the reference numeral 10. The system includes a fuel cell 12 having an anode 14 (which may also be referred to herein as an anode electrode), a cathode 16 (which may also be referred to as a cathode electrode), and an electrolyte 18 disposed between the anode and cathode. The electrolyte 18 may be in the form of a proton exchange membrane (PEM) of the type described in U.S. Pat. No. 6,024,848, or the electrolyte may be held within a ceramic matrix, such as is typically found in acid aqueous electrolyte fuel cells, such as phosphoric acid electrolyte fuel cells.

The anode electrode 14 includes an anode substrate 20 having an anode catalyst layer 22 disposed thereon on the side of the substrate 20 facing the electrolyte 18. The cathode electrode 16 includes a cathode substrate 24, having a cathode catalyst layer 26 disposed thereon on the side of the substrate facing the electrolyte 18. The cell also includes an anode flow field 28 adjacent the anode substrate 20 and a cathode flow field 30 adjacent the cathode substrate 24. The cathode flow field 30 defines a plurality of channels 32 extending through the cathode flow field 30 for carrying an oxidant, preferably air, across the cathode from a cathode inlet 34 to a cathode outlet 36. Similarly, the anode flow field 28 defines a plurality of channels 38 extending through the anode flow field 28 for carrying a hydrogen containing reducing fluid or fuel across the anode electrode 14 from an anode inlet 40 to an anode outlet 42. The anode flow field 28 and the cathode flow field 30 include pores, channels, or voids defined within the anode and cathode flow fields 28, 30 to direct the reactant streams passing through the fields 28, 30 to pass adjacent to and in contact with the anode electrode 14 or cathode electrode 16.

Each fuel cell 12 may also include a water transport plate or cooler plate 44 adjacent the cathode flow field plate 30 for removing heat and in some embodiments for removing product water from the fuel cell 12. The fuel cell 12 may also be of a design that utilizes solid separator plates, as is known in the art. The water transport plate 44 is secured in fluid communication with a coolant loop 46 having a coolant pump 48 for circulating a cooling fluid, such as water, through the coolant loop 46 and plate 44. A heat exchange radiator 50 and fan 52, which may be similar to a standard automotive radiator and fan, are also secured in heat exchange relationship with the coolant loop 46. A pressure regulating valve 54 may also be secured to the coolant loop 46 for regulating a pressure of the cooling fluid within the water transport plate 44 to be less than a pressure of the process oxidant passing through the adjacent cathode flow field 30.

Although only a single cell 12 is shown, in actuality a fuel cell power plant would comprise a plurality of adjacent cells (i.e. a stack of cells) connected electrically in series, each having a cooler plate 44 or separator plate (not shown) separating the cathode flow field of one cell from an anode flow field of the adjacent cell. For more detailed information regarding fuel cells like the one represented in FIG. 1, the reader is directed to commonly owned U.S. Pat. Nos. 5,503,944 and 4,115,627, both of which are incorporated herein by reference. The '944 patent describes a solid polymer electrolyte fuel cell wherein the electrolyte is a proton exchange membrane (PEM). The '627 patent describes a phosphoric acid electrolyte fuel cell wherein the electrolyte is a liquid held within a porous silicon carbide matrix layer. The present invention is particularly well suited for use with PEM cells; but it may also be used with phosphoric acid cells.

Referring, again, to FIG. 1, the fuel cell system includes a hydrogen containing reducing fluid fuel source 56 and a process oxidant source 58, such as air. The fuel may be pure hydrogen or other hydrogen rich fuel, such as reformed natural gas or gasoline. A cathode inlet line 60 carries air from the source 58 into the cathode flow field inlet 34; and a cathode exhaust line 62 carries spent air away from the cathode outlet 36. A cathode inlet valve 64 is secured to the cathode inlet line 60, and a cathode outlet valve 66 is secured to the cathode exhaust line 62 for permitting and terminating flow of the process oxidant or air through the cathode flow field 30. A blower 68 may be secured to the cathode inlet line 60 to slightly increase a pressure of the process oxidant stream passing through the cathode flow field 30.

An anode inlet line 70 is secured in fluid communication between the fuel source 56 and the anode flow field 28, and an anode exhaust line 72 directs the reducing fluid fuel stream out of the anode flow field 28. An anode inlet valve 74 is secured to the anode inlet line 70, and an anode exhaust valve 76 is secured to the anode exhaust line 72, for permitting or terminating flow of the hydrogen containing reducing fluid fuel through the anode flow field 28.

An anode recycle line 78 may be secured in fluid communication with the anode outlet 42 and the anode inlet 40, so that the anode recycle line 78 is secured between the anode outlet 42 and the anode exhaust valve 76, and between the anode inlet 40 and the anode inlet valve 74. The anode recycle line 78 includes an anode recycle pump or blower 80 for moving a portion of the anode exhaust stream within the anode exhaust line 72 through the anode recycle line 78 and into the anode inlet 40 back into the anode flow field 28. An oxidant feed line 82 is secured to the anode recycle line 78 to permit inflow of an oxidant to the recycle line 78, and the oxidant feed line 82 may be secured in fluid communication with the oxidant supply 58, or may simply be open to ambient air.

A fuel vacuum break valve 84 is secured to the oxidant feed line 82 to permit or terminate passage of the oxidant into the anode recycle line 78. The fuel vacuum break valve 84 is secured in fluid communication with the anode flow field 28, and serves as a check valve that permits oxidant to flow into the anode flow field 28, but does not permit the reducing fluid to flow out of the fuel cell 12. The fuel vacuum break valve 84 may be self-controlling, so that whenever the anode flow field 28 or anode recycle line 78 are at sub-ambient pressure, such as when the fuel cell 12 is cooling off during a shut-down period, the fuel vacuum break valve 84 permits the oxidant to flow into the anode flow field to maintain the pressure therein at ambient pressure. In the event no anode recycle line 78 is utilized, an alternative second fuel vacuum break valve 85 may be secured in fluid communication with the anode flow field 28, such as through a fuel vacuum break line 87 secured to the anode exhaust line 72 or directly through the anode exhaust line 72. Similarly, an oxidant vacuum break valve 93 may be secured in fluid communication with the cathode flow field 30, through an oxidant vacuum break line 95 secured to the cathode exhaust line 62, or directly through the cathode exhaust line 62. The oxidant vacuum break valve 93 would operate in the same manner as the fuel vacuum break line 84 to permit the oxidant or air to enter the cathode flow field 30 whenever pressure within the cathode flow field 30 descends below ambient pressure.

As shown by the hatched lines in FIG. 1, the fuel cell 12 and some of the related components described above, but at least the fuel cell 12, cathode exhaust valve 66 and anode exhaust valve 76 may be enclosed within a ventilation enclosure 86 that includes an adjacent ventilation fan 88 for rapidly exhausting out of the enclosure 86 to ambient surroundings any accumulated mixture of hydrogen and oxygen gases to eliminate a risk of such a mixture accumulating hydrogen to a flammable concentration. Upon start up of the fuel cell power plant 10, any accumulated hydrogen within the cathode flow field 28 will be mixed with the process oxidant blowing through the cathode flow field 28, and the ventilation enclosure 86 and fan 88 will insure that such a mixture is rapidly diluted with ambient air and removed from the fuel cell power plant 10.

The ventilation enclosure 86 may include a ventilation hydrogen sensor 89 which may be in communication with the ventilation fan 88 directly through a sensor electrical line 91, or indirectly through a fan control means (not shown) known in the art for controlling a concentration of hydrogen within the enclosure 86 by selectively operating the fan 88 whenever the ventilation hydrogen sensor 89 detects a concentration of hydrogen within the enclosure 86 that is above a preset level of a safe concentration of hydrogen. The preset level would typically be one percent hydrogen by volume, which corresponds to twenty-five percent of a lower flammability limit of hydrogen in the atmosphere. The ventilation hydrogen sensor 89 and ventilation fan 88 may be monitored and operated during operation, shutdown and startup of the fuel cell power plant 10.

The fuel cell power plant 10 also includes an external circuit 90 connecting the anode electrode 14 and cathode electrode 16. The external circuit 90 includes a primary load 92 connected to the external circuit 90 through a primary load switch 94. The external circuit may also include an auxiliary resistive load 96 connected to the external circuit through an auxiliary load switch 98, and the auxiliary load 96 may also include a diode 100 in series with the auxiliary resistive load 96. A power supply 102 is also connected to the external circuit 90 through a power supply switch 104.

During normal operation of the fuel cell power plant 10, the primary load switch 94 is closed (it is shown open in FIG. 1), and the auxiliary load switch 98 is open, so that the fuel cell power plant is providing electricity to the primary load, such as an electric motor, etc. The oxidant blower 68, the anode exhaust recycle blower 80 and the coolant pump 48 are all on. The cathode inlet and exhaust valves 64 and 66 are open, as are the anode inlet 74 and anode exhaust valves 76. The fuel vacuum break valve 84 is closed so that no air flows into the anode flow field via the anode recycle line. The coolant pressure control valve 54 is also open.

Therefore, during normal operation of the plant 10, process oxidant such as air from the oxidant source 58 is continuously delivered into the cathode flow field 30 inlet through the cathode inlet line 60, and leaves the cathode flow field 30 through the cathode exhaust line 62. The hydrogen containing reducing fluid fuel from the fuel source 56 is continuously delivered into the anode flow field 28 through the anode inlet line 70. A portion of the anode exhaust, containing depleted hydrogen fuel, leaves the anode flow field 28 through the anode exhaust line 72 and the anode exhaust valve 76, while the anode recycle line 78 and recycle blower 80 re-circulates the balance of the anode exhaust through the anode flow field 28 in a manner well know in the prior art. Recycling a portion of the anode exhaust helps maintain a relatively uniform gas composition from the anode inlet 40 to the anode outlet 42 of the anode flow field 28, and permits increased hydrogen utilization. As the hydrogen passes through the anode flow field, it electrochemically reacts on the anode catalyst layer 22 in a well-known manner to produce protons (hydrogen ions) and electrons. The electrons flow from the anode electrode 14 to the cathode electrode 16 through the external circuit 90 to power the primary load 92.

The method for shutting down the operating fuel cell power plant 10 according to this embodiment of the present invention includes opening or disconnecting the primary load switch 94 (as shown in FIG. 1) in the external circuit 90 to disconnect the primary load 92. The anode inlet or fuel flow valve 74 remains open; and the anode exhaust recycle blower 80 remains on to continue recirculation of a portion of the anode exhaust. However, the anode exhaust vent valve 76 will remain open or be closed depending upon the percent hydrogen in the incoming fuel and the relative volumes of the anode and cathode sides of the fuel cell, as is explained below. The flow of fresh air to the cathode flow field 30 is turned off by closing the cathode inlet valve 64. The cathode inlet blower 68 is also shut off. The auxiliary load 96 is connected to the external circuit by closing the auxiliary load switch 98. With current flowing through the auxiliary load 96, typical electrochemical cell reactions occur, causing the oxygen concentration in the cathode flow field 30 to be reduced and cell voltage to be lowered.

The application of the auxiliary load 96 is preferably initiated while there is still sufficient hydrogen within the fuel cell 12 to electrochemically react all the oxygen remaining within the fuel cell 12. It preferably remains connected at least until the cell voltage is lowered to a pre-selected value, preferably 0.2 volts per cell or less. The diode 100, connected across the cathode and anode 14, 16, senses the cell voltage and allows current to pass through the auxiliary load 96 as long as the cell voltage is above the pre-selected value. In that way, the fuel cell 12 voltage is reduced to and thereafter limited to the pre-selected value. When the cell voltage drops to 0.2 volts per cell, substantially all the oxygen within the cathode flow field 30, and any that has diffused across the electrolyte 18 to the anode flow field 28, will have been consumed. The auxiliary load 96 is then disconnected by opening the switch auxiliary load 98.

The power supply 102 is then connected to the external circuit by closing the power supply switch 104. By applying the electrical current from the power supply 102 to the anode and cathode electrodes 14, 16, the fuel cell 12 effectively turned into a hydrogen pump, wherein the hydrogen fuel dissociates at the anode electrode 14 into electrons and hydrogen ions. The hydrogen ions pass through the electrolyte 18 to the cathode electrode 16 as in normal fuel cell 12 operation, and the electrons flow through the power supply 102 to the cathode electrode 16 to evolve hydrogen at the cathode electrode 16 in the absence of oxygen. Therefore, application of the power supply 102 across the cell significantly decreases an amount of time necessary to achieve equilibrium of hydrogen concentrations within the anode and cathode flow fields 28, 30. Whenever equilibrium of hydrogen concentrations within the anode and cathode flow fields 28, 30 is achieved, the hydrogen pump is discontinued by opening the power supply switch 104 to disconnect the power supply 102. The cathode exhaust valve 66 is then shut down as well. The power supply 102 may be a DC electrical source, such as a battery.

In certain operating conditions after the hydrogen pump has achieved equilibrium of hydrogen concentrations within the fuel cell 12, the auxiliary switch 98 is closed so that the auxiliary load 96 is connected throughout the remainder of the shut down procedure to limit the cell voltage to no more than 0.2 volts per cell while the cell 12 is shut down. The auxiliary load 96 may include a resistive load, or any voltage limiting devices known in the art.

Whether the anode exhaust vent valve 76 needs to be open during the foregoing procedure is determined by the hydrogen concentration of the incoming fuel and the relative volumes of gas space on the anode and cathode sides of the cell 12. On the anode side, that includes the anode flow field 28 and its associated plumbing and manifolding, such as the anode recycle line 78 and fuel inlet and outlet manifolding (not shown), as is well known in the art. On the cathode side, it includes the cathode flow field 30 and its associated plumbing and manifolding, such as the cathode inlet and outlet lines 60, 62 and standard manifolding. The anode exhaust valve 76 may remain closed if there would be enough hydrogen trapped within the anode side gas space to consume all the oxygen remaining within the cathode side gas space, when the anode side hydrogen is combined with the hydrogen evolved at the cathode catalyst as a result of the power supply 102 adding current to the cell. Whether and for how long the fuel needs to continue to flow as the oxygen is consumed is easily determined by persons having ordinary skill in the art.

Once all the oxygen within the anode and cathode flow fields is consumed, and the hydrogen gas concentration has reached equilibrium between the anode and cathode flow fields 28, 30, the fuel feed or anode inlet valve 74 and the anode exhaust vent valve 76, if open, are shut. However, the anode exhaust recycle blower 80 remains on. The fuel vacuum break valve 84 and oxidant vacuum break valve 93 will open as needed to prevent formation of a partial vacuum within the fuel cell 12 as the fuel cell 12 cools to ambient temperatures.

For purposes herein, the phrase "fuel cell inert gases" means gases that do not react with hydrogen or oxygen or within the fuel cell, and do not otherwise harm cell performance to any significant extent, and are, therefore, harmless to the fuel cell. Fuel cell inert gases may also include trace amounts of elements found in atmospheric air. If the fuel is pure hydrogen and the oxidant is air, the "balance" fuel cell inert gas will be substantially all nitrogen, with a small amount of carbon dioxide found in atmospheric air, plus trace amounts of other elements found in atmospheric air. For purposes herein, carbon dioxide is considered a fuel cell inert gas since it does not react with hydrogen, oxygen, and is not otherwise harmful to the fuel cell to any significant extent.

If the fuel is a reformed hydrocarbon, the fuel entering the fuel cell 12 includes hydrogen, carbon dioxide, and carbon monoxide. The hydrogen concentration can vary from 30 to 80 volume percent hydrogen depending on the type of fuel processing system used in the power plant 10. In that case, air (i.e. essentially oxygen and nitrogen) is sometimes injected into the fuel upstream of the anode flow field 28 to oxidize the carbon monoxide. The carbon monoxide is not a fuel cell inert gas, and needs to be completely converted to carbon dioxide by reaction with oxygen during a shut down procedure. Therefore, in accordance with the present invention, when the fuel cell 12 is operated on a reformed hydrocarbon, the "balance fuel cell inert gases" may include a larger amount of carbon dioxide than in the case of cells using pure hydrogen as the fuel; however, the objective of an equilibrium gas composition of at least 0.0001% hydrogen, balance fuel cell inert gases, is the same. Preferred hydrogen concentration ranges include between 0.0001% and 10%, preferably between 1.0% and 4.0%, and most preferably about 1.0% (with the balance being fuel cell inert gases).

The fuel cell power plant 10 is now considered to be shut down, which is hereinafter sometimes referred to as in "storage" until the primary load 92 is reconnected and the plant 10 is restarted. During storage, air may leak slowly into the anode and cathode flow fields 28, 30 through seals; or hydrogen may leak out of the plant 10. As that happens, the gas composition within the fuel cell 12 will change. To counterbalance this leakage and maintain the equilibrium gas composition within the desired range during storage, the hydrogen concentration within the anode flow field 28 is monitored. Preferably this is done by turning on the anode recycle blower 80 from time to time, and taking a reading with a fuel cell hydrogen sensor (not shown) within the anode flow field 28 or anode recycle line 78 as the gases circulate. Hydrogen or a hydrogen rich fuel is then added to the anode flow field 28 (such as through the anode inlet valve 74), as needed, to maintain the gas composition within the desired range throughout the storage period (i.e. while the plant 10 is shut down).

When it is desired to restart or startup the fuel cell power plant, the auxiliary load 96, if still connected, is disconnected by opening the auxiliary load switch 98. The power supply 102 remains disconnected from the external circuit 90. The ventilation fan 88 is activated to flush ambient air through the ventilation enclosure 86, thereby diluting hydrogen that is vented out of the cathode exhaust valve 66 when that valve is opened. The coolant pump 48 may then be turned on. Turning on of the coolant pump 48 may be delayed if the fuel cell power plant 12 is shut down in freezing ambient conditions. The cathode inlet and exhaust valves 64, 66, anode inlet and exhaust valves 74, 76 are opened, the process oxidant cathode inlet blower 68, and the anode exhaust, or fuel recycle blower 80 are turned on, thereby flushing the anode flow field 28 with hydrogen and the cathode flow 30 field with air. The primary load 92 is then connected within the external circuit 90 by closing the switch 94.

In the present system and method for shutting down a fuel cell power plant 10 and in use of the system and method for restarting the power plant 10, it is to be understood that the valves 64, 66, 74, 72, 84, blowers 68, 84, pump 48, and switches 94, 98, 104 may be controlled to perform the described functions by any controller means known in the art for controlling fuel cell power plant valves, blowers, pumps and switches, including manual controls, electromechanical controls bases upon sensed information, etc. During shut-down of the power plant 10, the electrode potentials are maintained low by monitoring the hydrogen concentration and adding hydrogen in sufficient quantities to consume any oxygen that leaks into the flow fields 28, 30, or to replenish any hydrogen that leaks out.

Although the fuel cell power plant of FIG. 1 includes a separate fuel vacuum break valve 84 secured to the anode exhaust recycle line 78 for delivering required additional air into the anode flow 28 field during the shut down procedure, other means could be used as well. For example, ambient air could be drawn into the anode flow field 28 through the second fuel vacuum break valve 85 secured through the fuel vacuum break line 87 to the anode exhaust line 72.

In the fuel cell power plant 10 of FIG. 1 cathode inlet and exhaust valves 64, 66 in the cathode inlet and exhaust lines 60, 62 respectively, are used to prevent air from entering or leaving the cathode flow field 30 after the primary load 92 is disconnected. In some fuel cell systems however, a diffusion path in conduits upstream of the oxidant blower 68 and downstream of the cathode exhaust valve 66 may be so long that the inlet and exhaust valves 64, 66 may be unnecessary. That is, upon shut-down, once the blower 80 is turned off, if the diffusion paths are long enough, virtually no additional air will diffuse into the cathode flow field 30, even though the valves 64 and 66 remain open or are not employed. Similarly, on the fuel side, if the diffusion path downstream of the anode exhaust valve 76 is long enough, virtually no air will diffuse into the anode flow field 28 even with the anode exhaust valve 76 open. For that reason, it may even be possible to remove the cathode inlet 64 and exhaust 66 valves from the system.

It has been observed, through a series of start-up/shut-down tests of the described system and method for shutting down a fuel cell power plant 10, that generating an equilibrium gas composition of at least a dilute concentration of hydrogen, balance fuel cell inert gases, within the anode and cathode flow fields 28, 30 upon shut down, and then maintaining at least a dilute concentration of hydrogen, balance fuel cell inert gases, within the anode and cathode flow fields 28, 30 during shut-down, virtually eliminates performance losses that were observed when using other shut down procedures. It was also observed that the system and method for shutting down a fuel cell power plant of the present invention was able to regenerate cell performance lost by a fuel cell system that had experienced a series of shut downs and start ups that maintained 100% air on both sides of the cell throughout the period of shut-down. Such regeneration was surprising, since it was believed the lost performance had been due solely to catalyst and catalyst support corrosion, which cannot be reversed. This performance recovery led to the conclusion that some other mechanism was causing performance loss, and the present invention was able to reverse most, if not substantially all of that loss. The improvement is most dramatic at high current densities.

It is theorized that the additional performance decay mechanism is the formation of carbon oxides on the surface of carbon support material and the formation of platinum oxides on the surface of the catalysts. It is also theorized these oxides form if the electrodes are subjected to a high air potential during the shut down process, including while the cell remains idle. The surface oxides increase the wettability of the carbon and platinum causing partial flooding and, therefore, loss of performance. Factors that may be at work in the procedure of the present invention to eliminate the performance decay are the maintenance of a low electrode potential (versus the standard hydrogen electrode) during shut down and chemical and/or electrochemical reactions involving the presence of hydrogen.

In the system and method of the present invention, the equilibrium hydrogen concentration required to be maintained during shut down is based upon several factors. One factor is that 0.0001% hydrogen is the minimum amount needed to reduce (and maintain) the electrode potentials to less than 0.2 volts above the potential of a standard hydrogen reference electrode. At a potential less than 0.2 volts, platinum and platinum support corrosion and carbon and platinum oxidation are virtually eliminated. Actually, hydrogen concentration of at least 1% is preferred for two reasons: first, it will reduce the potential of the electrodes to less than 0.1 volts, at which level virtually no corrosion and surface oxidation occurs; and, second, it is easier to measure, monitor, and control than much smaller concentrations, such as 0.1% or less.

The upper end of the range for hydrogen concentration is not critical to the prevention of cell performance loss. Having 100% hydrogen throughout the cells would work fine, but is difficult and costly. For that reason, a 10% hydrogen concentration (balance fuel cell inert gases) is a more practical upper limit. On the other hand, for safety, it is preferred to have and to maintain a hydrogen concentration of less than 4%, since more than 4% hydrogen in air is considered in excess of the flammability limit. If there were less than 4% hydrogen, then any air that leaks into or is otherwise introduced into the cell would not be hazardous. If the shut-down equilibrium hydrogen concentration is maintained below 4%, the present invention will have the added benefit of allowing rapid start-up of the fuel cell by simply turning on the fuel flow and the air flow, without the necessity of first purging the hydrogen from the cathode flow field with an inert gas, such as nitrogen. For an extra margin of safety, a hydrogen concentration during shut down of no more than 25% of the lower flammable limit of 4% is preferred, which preferred upper limit is therefore about 1%.

The system and method for shutting down a fuel cell power plant 10 of the present invention therefore provide for efficiently shutting down the plant 10 while minimizing oxidative corrosion and fuel cell performance degradation resulting from known systems and methods for shutting down fuel cells.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A method of shutting down and restarting a fuel cell power plant, the fuel cell power plant including at least one fuel cell for generating electrical current from hydrogen containing reducing fluid and process oxidant reactant streams, the fuel cell including an anode electrode and a cathode electrode on opposed sides of an electrolyte, wherein during operation of the fuel cell, the reducing fluid stream flows through an anode flow field adjacent the anode electrode, the process oxidant stream flows through a cathode flow field adjacent the cathode electrode, an external circuit connected to the anode and cathode electrodes conducts the electrical current generated by the fuel cell, and a primary load is connected through a primary load switch to the external circuit to receive the electrical current, the method of shutting down the fuel cell power plant comprising the steps of:

a. disconnecting the primary load switch so that the primary load ceases receiving the electrical current from the fuel cell;

b. terminating flow of the process oxidant through the cathode flow field;

c. connecting an auxiliary load to the external circuit to receive any electrical current from the fuel cell to thereby consume oxygen remaining within the fuel cell;

d. disconnecting the auxiliary load after oxygen remaining within the fuel cell has been consumed;

e. then, connecting a power supply through a power supply switch to the external circuit so that electrical current from the power supply flows through the external circuit to the anode and cathode electrodes to increase a concentration of hydrogen within the cathode flow field; and, f. then, disconnecting the power supply and decreasing or eliminating flow of the hydrogen containing reducing fluid into the anode flow field after an equilibrium gas concentration of at least 0.0001% hydrogen, balance fuel cell inert gases, is achieved in both the anode and cathode flow fields while the fuel cell power plant is shut down.

2. The method of shutting down a fuel cell power plant of claim 1, comprising the further step of, recycling an anode exhaust stream from an anode outlet to an anode inlet.

3. The method of shutting down a fuel cell power plant of claim 1, comprising the further step of, after the step of decreasing or eliminating flow of the reducing fluid into the anode flow field, introducing an oxidant stream into the anode flow field and/or the cathode flow field to prevent formation of a partial vacuum within the fuel cell.

4. The method of shutting down a fuel cell power plant of claim 1, comprising the further step of, after the step of decreasing or eliminating flow of the reducing fluid into the anode flow field, introducing an oxidant stream through an anode recycle line into the anode flow field to prevent formation of a partial vacuum within the fuel cell.

5. The method of shutting down a fuel cell power plant of claim 1, comprising the further step of, after the step of decreasing or eliminating flow of the hydrogen containing reducing fluid into the anode flow field after an equilibrium gas concentration of at least 0.0001% hydrogen, balance fuel cell inert gases, is achieved, then terminating ventilation of the fuel cell by a ventilation fan that passes ambient air around the fuel cell and through a ventilation enclosure.

6. The method of shutting down a fuel cell power plant of claim 5, comprising the further steps of activating the ventilation fan to pass ambient air around the fuel cell to thereby remove any hydrogen from the ventilation enclosure prior to and during a startup of the shut down fuel cell, wherein the startup of the fuel cell includes the steps of flowing the process oxidant through the cathode flow field, flowing the reducing fluid through the anode flow field, and connecting the primary load switch so that the primary load receives electrical current from the fuel cell.

7. The method of shutting down a fuel cell power plant of claim 1, comprising the further steps of, after the step of decreasing or eliminating flow of the hydrogen containing reducing fluid into the anode flow field after an equilibrium gas concentration of at least 0.0001% hydrogen, balance fuel cell inert gases, is achieved, then monitoring a fuel cell hydrogen sensor within the fuel cell while the plant is shut down to determine a hydrogen concentration, and introducing hydrogen into the anode flow field whenever the sensor indicates additional hydrogen is necessary to maintain a hydrogen concentration within a desired hydrogen concentration range.

8. The method of shutting down a fuel cell power plant of claim 1, comprising the further step of, after the step of decreasing or eliminating flow of the hydrogen containing reducing fluid into the anode flow field after an equilibrium gas concentration of at least 0.0001% hydrogen, balance fuel cell inert gases, is achieved, then connecting the auxiliary load to the external circuit to receive any electrical current from the fuel cell.

* * * * *